(12) United States Patent
Shigeeda et al.

(10) Patent No.: US 9,813,503 B2
(45) Date of Patent: Nov. 7, 2017

(54) IP-ADDRESS DISTRIBUTION SYSTEM UTILIZING A PLURALITY OF SWITCHING DEVICES GROUPED INTO TWO OR MORE GROUPS

(75) Inventors: Tetsuya Shigeeda, Tokyo (JP); Shingo Honda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 233 days.

(21) Appl. No.: 14/111,296

(22) PCT Filed: Jun. 30, 2011

(86) PCT No.: PCT/JP2011/065059
§ 371 (c)(1),
(2), (4) Date: Oct. 11, 2013

(87) PCT Pub. No.: WO2013/001641
PCT Pub. Date: Jan. 3, 2013

(65) Prior Publication Data
US 2014/0032734 A1     Jan. 30, 2014

(51) Int. Cl.
*G06F 15/173* (2006.01)
*H04L 29/08* (2006.01)
(Continued)

(52) U.S. Cl.
CPC .......... *H04L 67/12* (2013.01); *B61L 15/0036* (2013.01); *B61L 15/0072* (2013.01);
(Continued)

(58) Field of Classification Search
CPC ... H04L 61/2015; H04L 67/12; H04L 49/355; H04L 61/2038; B61L 15/0072; B61L 15/0036
(Continued)

(56) References Cited

U.S. PATENT DOCUMENTS 6,363,489 B1 * 3/2002 Comay ............... H04L 63/1416
                                                    709/224
6,374,295 B2 * 4/2002 Farrow et al. ................ 709/223
(Continued)

FOREIGN PATENT DOCUMENTS

EP         1995147 A1    11/2008
JP      2005-79721 A     3/2005
(Continued)

OTHER PUBLICATIONS

Extended European Search Report dated Sep. 29, 2014, issued by the European Patent Office in corresponding European Patent Application No. 11868833.2 (8 pgs).
(Continued)

*Primary Examiner* — Daniel C. Murray
(74) *Attorney, Agent, or Firm* — Buchanan Ingersoll & Rooney PC (57) ABSTRACT

An IP-address distribution system according to the present invention includes a network formed by a plurality of switching devices, and a plurality of IP-address distribution devices connected to the network, wherein the switching devices are grouped into two or more groups, and the switching devices interrupt an IP-address request signal transmitted from a terminal that requests allocation of an IP address at a physical port to which a switching device in another group is connected.

12 Claims, 5 Drawing Sheets

(51) Int. Cl.
*H04L 29/12* (2006.01)
*H04L 12/931* (2013.01)
*B61L 15/00* (2006.01)

(52) U.S. Cl.
CPC ........ *H04L 49/355* (2013.01); *H04L 61/2015* (2013.01); *H04L 61/2038* (2013.01)

(58) Field of Classification Search
USPC .......................................................... 709/223
See application file for complete search history.

(56) References Cited

U.S. PATENT DOCUMENTS

| | | | |
|---|---|---|---|
| 6,564,216 B2* | 5/2003 | Waters | |
| 6,654,891 B1* | 11/2003 | Borsato et al. ................... | 726/6 |
| 7,096,273 B1* | 8/2006 | Meier ............................ | 709/236 |
| 7,111,100 B2* | 9/2006 | Ellerbrock ..................... | 710/300 |
| 7,231,660 B1* | 6/2007 | Daude et al. ..................... | 726/4 |
| 7,263,559 B2* | 8/2007 | Yao ................... H04L 29/12028 | |
| | | | 709/230 |
| 7,356,009 B1* | 4/2008 | Meier et al. .................. | 370/338 |
| 7,376,718 B2* | 5/2008 | Gould ................ H04L 41/0806 | |
| | | | 709/217 |
| 7,437,494 B2* | 10/2008 | Ellerbrock .................... | 710/113 |
| 7,532,604 B2* | 5/2009 | Eglin ........................... | 370/338 |
| 7,539,770 B2* | 5/2009 | Meier .......................... | 709/236 |
| 7,649,866 B2* | 1/2010 | Chari ................. H04L 12/2856 | |
| | | | 370/331 |
| 7,792,963 B2* | 9/2010 | Gould .................. H04N 7/163 | |
| | | | 709/225 |
| 7,886,358 B2* | 2/2011 | Copeland, III ....... G06F 21/552 | |
| | | | 705/51 |
| 8,000,698 B2* | 8/2011 | Wolman et al. ............. | 455/423 |
| 8,060,623 B2* | 11/2011 | Vogel et al. ................. | 709/228 |
| 8,064,404 B2* | 11/2011 | Chari ................. H04L 12/2856 | |
| | | | 370/331 |
| 8,089,967 B2* | 1/2012 | Hazard .................. H04L 45/02 | |
| | | | 370/395.3 |
| 8,144,709 B2* | 3/2012 | Hazard .................. H04L 12/66 | |
| | | | 370/392 |
| 8,458,303 B2* | 6/2013 | Moreman ........... H04L 61/2015 | |
| | | | 709/220 |
| 8,477,715 B2* | 7/2013 | Bahini et al. ................. | 370/331 |
| 8,489,766 B2* | 7/2013 | Shizuno ........................ | 709/245 |
| 8,560,644 B2* | 10/2013 | Meier et al. ................. | 709/220 |
| 8,572,061 B2* | 10/2013 | Kishimoto .................... | 707/705 |
| 8,621,556 B1* | 12/2013 | Bharali .............. H04L 61/1511 | |
| | | | 726/1 |
| 8,743,873 B2 | 6/2014 | Shigeeda | |
| 8,856,296 B2* | 10/2014 | Subramanian ................ | 709/222 |
| 8,862,747 B2* | 10/2014 | Shah ....................... H04W 4/02 | |
| | | | 709/227 |
| 8,972,542 B2* | 3/2015 | Christenson et al. ........ | 709/221 |
| 8,984,106 B2* | 3/2015 | Christenson et al. ........ | 709/221 |
| 9,060,027 B2* | 6/2015 | Patwardhan ........ H04L 61/2015 | |
| 9,124,627 B2* | 9/2015 | Bharali .............. H04L 61/1511 | |
| 9,497,503 B2* | 11/2016 | Gould .................... H04N 7/163 | |
| 9,503,424 B2* | 11/2016 | Jin ....................... H04L 61/1511 | |
| 9,659,314 B2* | 5/2017 | Shah .................... G06Q 30/0269 | |
| 9,661,493 B2* | 5/2017 | Jung ........................ H04W 8/26 | |
| 2002/0010767 A1* | 1/2002 | Farrow et al. ................ | 709/223 |
| 2002/0052876 A1* | 5/2002 | Waters ........................... | 707/100 |
| 2003/0210671 A1* | 11/2003 | Eglin ............................ | 370/338 |
| 2004/0006712 A1* | 1/2004 | Yao ................... H04L 29/12028 | |
| | | | 726/22 |
| 2004/0133721 A1* | 7/2004 | Ellerbrock .................... | 710/104 |
| 2005/0015810 A1* | 1/2005 | Gould ................ H04L 41/0806 | |
| | | | 725/111 |
| 2005/0055708 A1* | 3/2005 | Gould .................. H04N 7/163 | |
| | | | 725/25 |
| 2005/0074015 A1* | 4/2005 | Chari ................. H04L 12/2856 | |
| | | | 370/400 |
| 2005/0096057 A1 | 5/2005 | Yokota | |
| 2005/0122946 A1* | 6/2005 | Won ............................ | 370/338 |
| 2005/0237962 A1* | 10/2005 | Upp ......................... H04W 8/26 | |
| | | | 370/313 |
| 2006/0050681 A1* | 3/2006 | Monteiro et al. ............. | 370/352 |
| 2006/0280179 A1* | 12/2006 | Meier ............................ | 370/389 |
| 2006/0288413 A1 | 12/2006 | Kubota | |
| 2007/0088885 A1* | 4/2007 | Ellerbrock .................... | 710/113 |
| 2007/0183426 A1* | 8/2007 | Daude et al. ................. | 370/392 |
| 2007/0289017 A1* | 12/2007 | Copeland ............. G06F 21/552 | |
| | | | 726/23 |
| 2007/0298720 A1* | 12/2007 | Wolman et al. ............. | 455/66.1 |
| 2008/0019319 A1* | 1/2008 | Bahini et al. ................. | 370/331 |
| 2008/0062874 A1 | 3/2008 | Shimadoi | |
| 2008/0071890 A1* | 3/2008 | Meier ............... H04L 29/12933 | |
| | | | 709/220 |
| 2008/0244076 A1* | 10/2008 | Shah ....................... H04W 4/02 | |
| | | | 709/227 |
| 2008/0247396 A1* | 10/2008 | Hazard .................. H04L 12/66 | |
| | | | 370/392 |
| 2008/0247399 A1* | 10/2008 | Hazard .................. H04L 45/02 | |
| | | | 370/395.31 |
| 2009/0300176 A1* | 12/2009 | Shizuno ........................ | 709/224 |
| 2010/0085920 A1* | 4/2010 | Chari ................. H04L 12/2856 | |
| | | | 370/328 |
| 2010/0281159 A1* | 11/2010 | Boscolo ................ H04L 63/20 | |
| | | | 709/224 |
| 2010/0293564 A1* | 11/2010 | Gould .................... H04N 7/163 | |
| | | | 725/1 |
| 2011/0022632 A1* | 1/2011 | Kishimoto .................... | 707/770 |
| 2011/0263242 A1* | 10/2011 | Tinnakornsrisuphap et al. ........ | 455/422.1 |
| 2011/0271345 A1* | 11/2011 | Wolman et al. ................ | 726/23 |
| 2011/0280158 A1 | 11/2011 | Shigeeda | |
| 2011/0286464 A1 | 11/2011 | Shigeeda | |
| 2012/0011230 A1* | 1/2012 | Moreman ........... H04L 61/2015 | |
| | | | 709/220 |
| 2012/0263179 A1 | 10/2012 | Shigeeda et al. | |
| 2012/0289237 A1* | 11/2012 | Howlett et al. ............... | 455/450 |
| 2013/0080614 A1* | 3/2013 | Iyer .............................. | 709/223 |
| 2013/0125124 A1* | 5/2013 | Kempf ................. G06F 9/45533 | |
| | | | 718/1 |
| 2013/0166706 A1* | 6/2013 | Christenson et al. ........ | 709/221 |
| 2013/0166707 A1* | 6/2013 | Christenson et al. ........ | 709/221 |
| 2013/0166723 A1* | 6/2013 | Christenson et al. ........ | 709/224 |
| 2013/0166737 A1* | 6/2013 | Christenson et al. ........ | 709/224 |
| 2013/0166748 A1* | 6/2013 | Christenson et al. ........ | 709/226 |
| 2013/0166754 A1* | 6/2013 | Christenson et al. ........ | 709/226 |
| 2014/0006575 A1* | 1/2014 | Subramanian ................ | 709/222 |
| 2014/0150051 A1* | 5/2014 | Bharali .............. H04L 61/1511 | |
| | | | 726/1 |
| 2014/0289311 A1* | 9/2014 | Kubota et al. ................ | 709/203 |
| 2014/0359136 A1* | 12/2014 | Subramanian ................ | 709/226 |
| 2015/0012625 A1* | 1/2015 | Patwardhan ........ H04L 61/2015 | |
| | | | 709/221 |
| 2015/0032550 A1* | 1/2015 | Shah ....................... H04W 4/02 | |
| | | | 705/14.66 |
| 2016/0014082 A1* | 1/2016 | Bharali .............. H04L 61/1511 | |
| | | | 726/1 |

FOREIGN PATENT DOCUMENTS

| | | |
|---|---|---|
| JP | 2006-352669 A | 12/2006 |
| JP | 2008-67306 A | 3/2008 |
| WO | WO 9826530 A1 * 6/1998 ............... H04J 3/02 |
| WO | 2010087258 A1 | 8/2010 |
| WO | WO 2010/087259 | 8/2010 |
| WO | 2011/074123 A1 | 6/2011 |

OTHER PUBLICATIONS

Internet Citation, "Planning DHCP Networks", Jan. 21, 2005, pp. 1-6, XP007922842; URL:http://technet.microsoft.com/en-us/library/cc786002%028v=ws.10%29.aspx.

Droms, R., Bucknell University, Dynamic Host Configuration Protocol; rfc2131.txt, Mar. 1997, pp. 1-46, XP015007915.

International Search Report (PCT/ISA/210) dated Sep. 13, 2011, by (56) References Cited

OTHER PUBLICATIONS theJapanese* Patent Office as the International Searching Authority for International Application No. PCT/JP2011/065059.
Written Opinion (PCT/ISA/237) dated Sep. 13, 2011, by the Japanese Patent Office as the International Searching Authority for International Application No. PCT/JP2011/065059.
Douglas E. Comer, "Bootstrap and Autoconfiguration (DHCP)", Internetworking with TCP/IP vol. 1, 5th Edition, (Kyoritsu Shuppan Co., Ltd.), pp. 402-416.
European Office Action corresponding to European Patent Application No. 11868833.2, dated Jul. 6, 2015; 6 pages.
Office Action dated Jul. 6, 2016, by the Chinese Patent Office in corresponding Chinese Patent Application No. 201180071133.2 and English translation of the Office Action. (13 pages).
Chinese Office Action in corresponding Chinese Patent Application No. 201180071133.2, dated Dec. 1, 2015 (15 pages).
Lu, Liang-Xian, "The Application of the Virtual Local Area Network on the Broadband Metropolitan Area Network", China Cable Television, Quzhou broadcast translation, Zhejiang Quzhou 324000, China, pp. 60-62.

\* cited by examiner

| DESTINATION ADDRESS |
| SOURCE ADDRESS |
| LOGICAL PORT NUMBER |
| SOURCE SPECIFIC INFORMATION |

IP-ADDRESS DISTRIBUTION SYSTEM UTILIZING A PLURALITY OF SWITCHING DEVICES GROUPED INTO TWO OR MORE GROUPS

FIELD

The present invention relates to IP address distribution, and more particularly to an IP-address distribution system used in a train including a plurality of vehicles.

BACKGROUND

In TCP/IP that is frequently used as a communication protocol between devices, an IP address is used as information for identifying the device. When the TCP/IP is used, a uniquely determined IP address needs to be allocated to each device on the network.

As a mechanism that automatically provides an IP address to each device on the network, there is a method using a DHCP (Dynamic Host Configuration Protocol). In the DHCP, a device that manages and distributes IP addresses is referred to as a DHCP server, and a device that requests an IP address is referred to as a DHCP client. When being physically connected to the network, the DHCP client transmits an IP-address request packet to the network by broadcast. Upon reception of the IP-address request packet, the DHCP server prepares an IP address for the DHCP client and distributes the IP address to a source device (the DHCP client) via the network (see, for example, Non Patent Literature 1).

CITATION LIST

Non Patent Literature

Non Patent Literature 1: Internetworking with TCP/IP Vol. 1, 4th Edition, by Douglas E. Comer (Kyoritsu Shuppan Co., Ltd.)

SUMMARY

Technical Problem

When the IP address is provided by using the DHCP, the DHCP server receives the IP-address request packets from all the DHCP clients in a broadcast domain (a broadcast reachable area), and selects and allocates one of unused IP addresses, upon reception of a request packet from each DHCP client. However, because the DHCP server allocates the IP address without taking the physical configuration of the network into consideration, there are problems described below.

For example, a case is considered in which a network is constructed in a train including a plurality of vehicles. In the network in a train, a mechanism that classifies respective devices into groups corresponding to a car number or the like, for example, for management of devices connected to the network, and that manages and distributes IP addresses for each group may be required, that is, a mechanism that allocates an IP address in a certain area for each group may be required. Furthermore, a case can be considered in which a mechanism that classifies the same type of devices into the same group, not by the car numbers (the vehicle in which the device is installed), to manage and distribute IP addresses is required. By classifying the devices in this manner, the group of the network device (the corresponding car number or the like) can be discriminated from the IP address, and when communication abnormalities occur due to a failure or the like, the device can be easily specified, thereby increasing convenience in management of the network devices. The mechanism can be easily realized by dividing the network into segments (sub-networks) by installing a router and providing the DHCP server in each segment. However, the router is very expensive, and when the number of routers increases, the cost increases. Therefore, it is desired to avoid the method of realizing the mechanism using the router.

The present invention has been achieved to solve the above problems, and an object of the present invention is to provide an IP-address distribution system that can realize a mechanism that manages and distributes IP addresses for each group by grouping network devices in a single network, while suppressing a cost increase.

Solution to Problem

In order to solve the above problems and achieve the object, an IP-address distribution system according to the present invention includes a network formed by a plurality of switching devices, and a plurality of IP-address distribution devices connected to the network, wherein the switching devices are grouped into two or more groups, and the switching devices interrupt an IP-address request signal transmitted from a terminal that requests allocation of an IP address at a physical port to which a switching device in another group is connected.

Advantageous Effects of Invention

According to the present invention, an effect is obtained where an IP-address distribution system that can manage and distribute IP addresses for each of partial network devices by dividing a network into a plurality of networks, while suppressing a cost increase can be realized. Particularly, when the present invention is applied to a train including a plurality of vehicles, for example, the IP addresses can be managed and distributed for each car (vehicle).

DESCRIPTION OF EMBODIMENTS

Exemplary embodiments of an IP-address distribution system according to the present invention will be explained below in detail with reference to the drawings. This invention is not limited to the embodiments.

First Embodiment.

Figure 1:
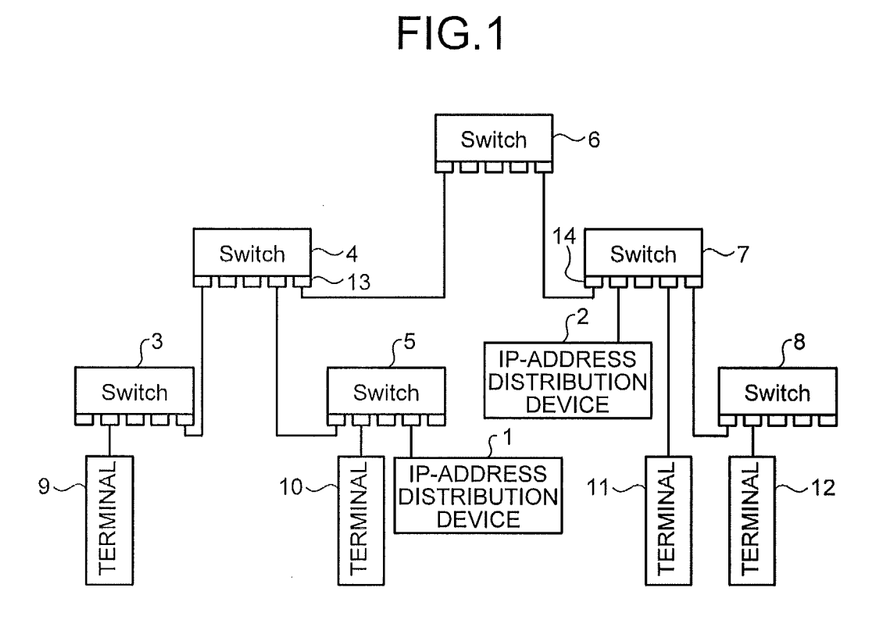
FIG. 1 is a diagram illustrating a configuration example of an IP-address distribution system according to a first embodiment.

FIG. 1 is a diagram illustrating a configuration example of an IP-address distribution system according to the first embodiment. The IP-address distribution system according to the present embodiment includes IP-address distribution devices 1 and 2 and switches 3 to 8, which are Ethernet (registered trademark) switches. The IP-address distribution device 1 is connected to the switch 5, and the IP-address distribution device 2 is connected to the switch 7. The switch 3 is connected to the switch 4, and the switch 4 is connected to the switches 3, 5, and 6. The switch 5 is connected to the switch 4, and the switch 6 is connected to the switches 4 and 7. The switch 7 is connected to the switches 6 and 8, and the switch 8 is connected to the switch 7. Terminals 9, 10, 11, and 12 are respectively connected to the switches 3, 5, 7, and 8. The terminals 9 to 12 are devices that request the IP-address distribution device 1 or 2 to allocate an IP address and receive allocation of the IP address.

A procedure of determining the IP address of a terminal is explained with reference to a sequence diagram of FIG. 2. The terminal transmits an IP-address request signal to the IP-address distribution device in a network by broadcast with a logical port number 68. Upon reception of the IP-address request signal, the IP-address distribution device determines an IP address to be allocated to the requestor and distributes the IP address to the terminal by an IP-address distribution signal of a logical port number 67.

In the IP-address distribution system according to the present embodiment, at a physical port 13 used for connection to the switch 6, of physical ports of the switch 4, a signal of the logical port number 67 and a signal of the logical port number 68 are interrupted. Similarly, at a physical port 14 used for connection to the switch 6, of physical ports of the switch 7, the signal of the logical port number 67 and the signal of the logical port number 68 are interrupted.

Figure 2:
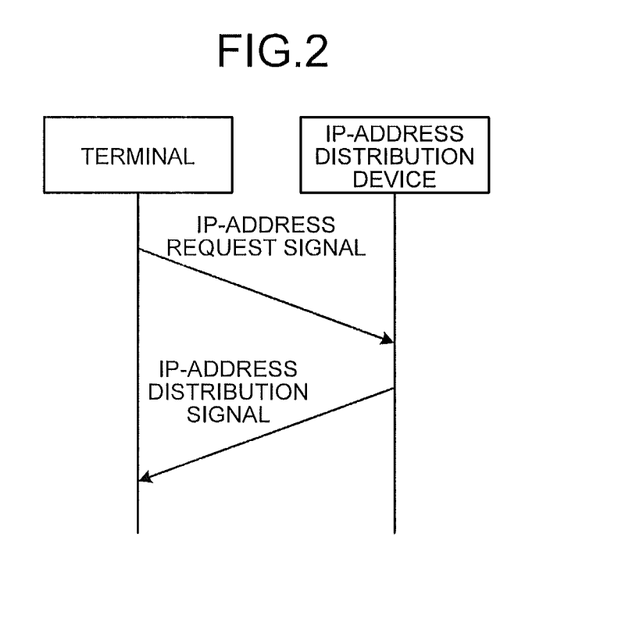
FIG. 2 is a sequence diagram illustrating a distribution procedure of an IP address in the IP-address distribution system according to the first embodiment.

Accordingly, the procedure for the terminal 9 to receive allocation of the IP address according to the sequence shown in FIG. 2 is as described below.

When the terminal 9 is connected to the network including the switches 3 to 8, the terminal 9 transmits an IP-address request signal to the switch 3 by broadcast with the logical port number 68. Because the IP-address request signal is transmitted by broadcast, the IP-address request signal reaches the IP-address distribution device 1 via the switches 3, 4, and 5. However, because the logical port number 68 is interrupted between the switches 4 and 6, the IP-address request signal cannot reach the switch 6. As a result, the IP-address request signal does not reach the IP-address distribution device 2. Therefore, only the IP-address distribution device 1 allocates the IP address, and the terminal 9 receives the IP-address distribution signal transmitted by the IP-address distribution device 1. The terminal 9 having received distribution of the IP address sets the IP address to the distributed value.

Thereafter, the terminal 9 starts IP communication. Because the IP-address distribution signal transmitted by the IP-address distribution device 1 has a logical port number 67, the IP-address distribution signal does not pass through the physical port 13 of the switch 4. Therefore, the IP-address distribution signal transmitted by the IP-address distribution device 1 is not received by the terminal connected to the switch 6, 7, or 8 (terminals 11, 12 shown in FIG. 1 and the like). Because at the physical port 13, only the signal of the logical port number 67 and the signal of the logical port number 68 are interrupted, upon reception of allocation of the IP address, the terminal 9 can communicate with the terminals 11 and 12 via the switch 6 connected to the physical port 13.

The procedure for the terminal 12 to receive allocation of the IP address according to the sequence shown in FIG. 2 is as described below.

When the terminal 12 is connected to the network including the switches 3 to 8, the terminal 12 transmits an IP-address request signal to the connected switch 8 by broadcast with the logical port number 68. The IP-address request signal reaches the IP-address distribution device 2 connected to the switch 7. However, because the IP-address request signal is interrupted at the physical port 14 of the switch 7, the IP-address request signal does not reach the IP-address distribution device 1. As a result, only the IP-address distribution device 2 allocates the IP address, and the terminal 12 receives the IP-address distribution signal transmitted by the IP-address distribution device 2. Because the IP-address distribution signal transmitted by the IP-address distribution device 2 has the logical port number of 67, the IP-address distribution signal does not pass through the physical port 14 of the switch 7. Therefore, the IP-address distribution signal is not received by the terminal connected to the switch 3, 4, 5, or 6 (the terminals 9, 10 shown in FIG. 1 and the like).

The switch 6 of the IP-address distribution system shown in FIG. 1 may be omitted to directly connect the physical port 13 of the switch 4 to the physical port 14 of the switch 7. Furthermore, without interrupting signals of the logical port numbers 67 and 68 at the physical port 13 of the switch 4 and the physical port 14 of the switch 7, the signals may be interrupted at the physical port used for connection to the switch 4 and the physical port used for connection to the switch 7, of the physical ports of the switch 6 (the signals of the logical port numbers 67 and 68 are not transmitted to these physical ports).

As a mechanism of the IP address distribution between the IP-address distribution device and the terminal in the IP-address distribution system according to the present embodiment, the IP-address distribution device can operate as the DHCP server and the terminal can operate as the DHCP client.

In the present embodiment, a case where there are two IP-address distribution devices has been explained. However, there can be three or more IP-address distribution devices. When there are three or more IP-address distribution devices, in a similar manner, the signals of the logical port numbers 67 and 68 only need to be interrupted at a physical port of a part of the switches so that the IP-address request signal from each terminal does not reach a plurality of IP-address distribution devices (so that the IP-address distribution signal reaches only one IP-address distribution device).

In this manner, the IP-address distribution system according to the present embodiment includes the network formed by a plurality of switches (Ethernet switches) and the IP-address distribution devices respectively connected to different switches, and it is configured such that the IP-address request signal from the terminal reaches only one IP-address distribution device by interrupting the signal of the logical port number 68 at the physical port of a part of the switches. Accordingly, network devices in a single network can be grouped, and the IP addresses can be managed and distributed for each group. Because the signal of the logical port number 67 is also interrupted at the physical port that interrupts the signal (the IP-address request signal) of the logical port number 68, it can be prevented that the IP-address distribution signal, which is a response signal to the IP-address request signal, is transferred unnecessarily.

Second Embodiment.

Figure 3:
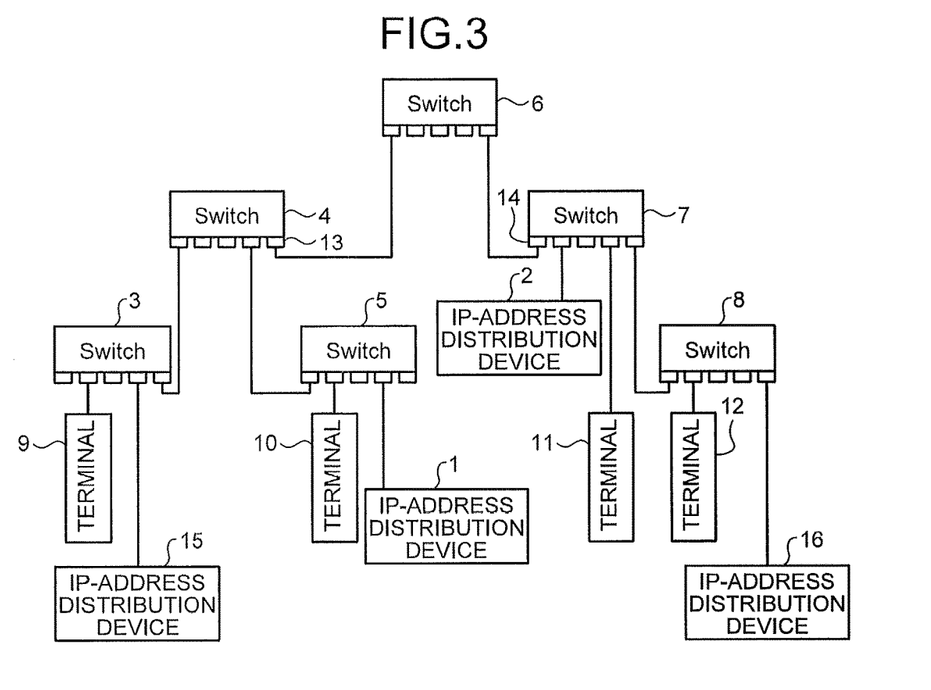
FIG. 3 is a diagram illustrating a configuration example of an IP-address distribution system according to a second embodiment.

FIG. 3 is a diagram illustrating a configuration example of an IP-address distribution system according to the second embodiment. In FIG. 3, constituent elements identical to those of the IP-address distribution system according to the first embodiment (see FIG. 1) are denoted by like reference signs. In the present embodiment, explanations of portions common to the IP-address distribution system according to the first embodiment will be omitted. As shown in FIG. 3, the IP-address distribution system according to the present embodiment has such a configuration that IP-address distribution devices 15 and 16 are added to the IP-address distribution system according to the first embodiment. The IP-address distribution device 15 is connected to the switch 3, and the IP-address distribution device 16 is connected to the switch 8. The relation of connection among the IP-address distribution devices 1 and 2, the switches 3 to 8, and the terminals 9 to 12 is the same as that of the first embodiment. At the physical port 13 of the switch 4 and the physical port 14 of the switch 7, the signal of the logical port number 67 and the signal of the logical port number 68 are interrupted in a similar manner to the first embodiment. Therefore, among the signals transmitted from the device connected to the switch 3, 4, or 5 (the IP-address distribution devices 1 and 15, and the terminals 9 and 10), the signal of the logical port number 67 and the signal of the logical port number 68 do not reach the device connected to the switch 7 or 8 (IP-address distribution devices 2 and 16, and the terminals 11 and 12). Similarly, among the signals transmitted from the device connected to the switch 7 or 8, the signal of the logical port number 67 and the signal of the logical port number 68 do not reach the device connected to the switch 3, 4, or 5.

The procedure of determining the IP address of the terminal when the IP-address distribution system according to the present embodiment is applied is explained with reference to a sequence diagram in FIG. 4. In the IP-address distribution system according to the present embodiment, the IP-address request signal reaches two IP-address distribution devices. Therefore, ranges of the IP addresses (IP addresses to be allocated to a source device upon reception of the IP-address request signal) managed by these two IP-address distribution devices are set not to overlap each other.

Figure 4:
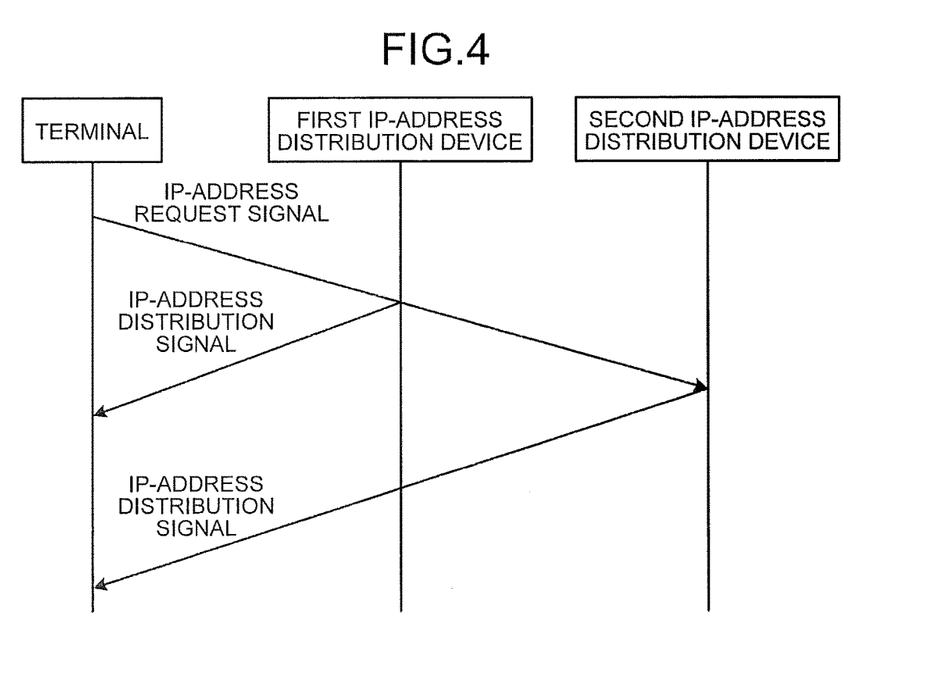
FIG. 4 is a sequence diagram illustrating a distribution procedure of an IP address in the IP-address distribution system according to the second embodiment.

As shown in FIG. 4, the terminal transmits the IP-address request signal to the IP-address distribution devices in the network by broadcast with the logical port number 68. Upon reception of the IP-address request signal, a first IP-address distribution device, which is one of the two IP-address distribution devices to which the IP-address request signal reaches, determines an IP address and distributes the IP address to the terminal by an IP-address distribution signal of the logical port number 67. Upon reception of the IP-address request signal, a second IP-address distribution device, which is the other of the two IP-address distribution devices, also determines an IP address and distributes the IP address to the terminal by the IP-address distribution signal of the logical port number 67 in a similar manner. Upon reception of both the IP-address distribution signal from the first IP-address distribution device and the IP-address distribution signal from the second IP-address distribution device, the terminal determines to use the IP address notified by the IP-address distribution signal from the first IP-address distribution device, to start IP communication. Upon reception of the IP-address distribution signal only from one of the IP-address distribution devices within a certain period of time after transmission of the IP-address request signal, the terminal determines to use the IP address notified by the received IP-address distribution signal, to start IP communication. When the terminal did not receive the IP-address distribution signal within a certain period of time after transmission of the IP-address request signal, the terminal retransmits the IP-address request signal. Regarding which one of the two IP-address distribution devices is set to be the first IP-address distribution device, for example, an IP-address distribution device that has transmitted the IP-address distribution signal first can be set to be the first IP-address distribution device.

An IP-address determining procedure performed by the IP-address distribution system of the present embodiment is explained next. The procedure when the terminal 9 receives allocation of the IP address according to the sequence shown in FIG. 4 is explained as an example.

When the terminal 9 is connected to the network including the switches 3 to 8, the terminal 9 transmits an IP-address request signal to the switch 3 by broadcast with the logical port number 68. Because the IP-address request signal is transmitted by broadcast, the IP-address request signal reaches the IP-address distribution device 1 via the switches 3, 4, and 5. The IP-address request signal also reaches the IP-address distribution device 15 via the switch 3. However, because the logical port number 68 is interrupted between the switches 4 and 6, the IP-address request signal cannot reach the switch 6. As a result, the IP-address request signal does not reach the IP-address distribution devices 2 and 16. Therefore, the terminal 9 receives both the IP-address distribution signal transmitted by the IP-address distribution device 1 and the IP-address distribution signal transmitted by the IP-address distribution device 15. Upon reception of the IP-address distribution signals, the terminal 9 selects and sets the IP address notified by the IP-address distribution signal received first. Thereafter, the terminal 9 starts IP communication.

In this manner, in the IP-address distribution system according to the present embodiment, because the IP-address request signal transmitted by the terminal can reach a plurality of IP-address distribution devices, the terminal can start IP communication by receiving distribution of the IP address, even when a failure occurs, such as when one of the IP-address distribution devices is broken down or there is a failure in an access route to one of the IP-address distribution devices. Furthermore, similarly to the first embodiment, because the signal of the logical port number 67 and the signal of the logical port number 68 are interrupted at the physical port of a part of the switches, the network devices can be grouped, and the IP addresses can be managed and distributed for each group.

Third Embodiment.

An IP-address distribution system according to the third embodiment is explained. Configurations of the system are similar to those of the second embodiment (see FIG. 3). Similarly to the first and second embodiments, it is assumed that the signal of the logical port number 67 and the signal of the logical port number 68 are interrupted at the physical port 13 of the switch 4 and the physical port 14 of the switch 7. In the present embodiment, portions different from those of the second embodiment are explained.

Figure 5:
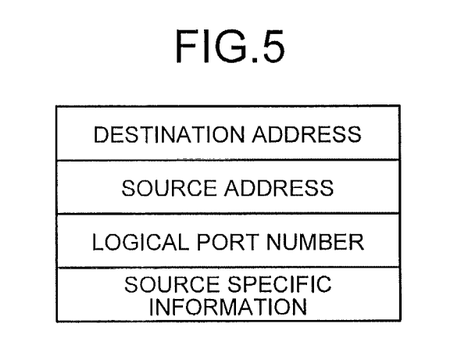
FIG. 5 is a diagram illustrating a configuration example of an IP-address request signal.

FIG. 5 is a diagram illustrating a configuration example of the IP-address request signal used in the IP-address distribution system according to the present embodiment. As shown in FIG. 5, the IP-address request signal includes a destination address, a source address, a logical port number, and source specific information. An address value specifying the entire network (broadcast) is set in the destination address. An address of the terminal that transmits the IP-address request signal is set in the source address. The respective devices (the IP-address distribution devices and the terminals) receive a signal in which the destination address indicates its own address and a signal having an address value specifying the entire network in the destination address, of the signals in the network. In the case of the IP-address request signal, "68" is set to the logical port number as explained above. The source specific information is information for specifying the source of the IP-address request signal, and is information uniquely indicating the source device (the terminal). A model name (information indicating the device type of the terminal), a device number (device individual information on the terminal), and the like are set in the source specific information. For example, when there is only one model present in the range of access of the signals of the logical port numbers 67 and 68, only the model name is set. When there are a plurality of models present in the range of access of the signals of the logical port numbers 67 and 68, the model name and the device number are set. The IP-address distribution device according to the present embodiment distributes the IP address corresponding to the source specific information in the IP-address request signal.

The procedure of determining the IP address of the terminal when the IP-address distribution system according to the present embodiment is applied is explained with reference to the sequence diagram shown in FIG. 4. The respective IP-address distribution devices (the first IP-address distribution device and the second IP-address distribution device) have a mechanism that distributes an IP address corresponding to the source specific information in the IP-address request signal. Upon reception of the IP-address request signal in which the same information is set in the source specific information, the respective IP-address distribution devices distribute the same IP address. That is, upon reception of the IP-address request signal from a terminal, the respective IP-address distribution devices distribute the same IP address by the IP-address distribution signal with respect to the IP-address request signal. As a method of distributing the same IP address by the respective IP-address distribution devices, for example, the respective IP-address distribution devices can determine a range of the IP address to be allocated beforehand for each type (model) of the terminal, and upon reception of the IP-address request signal, can allocate the minimum value of the IP addresses that are not in use (have not been allocated) at that point.

When the present embodiment is applied, efficient operations of the IP address can be realized as compared with a case of applying the second embodiment. In the second embodiment, because the respective IP-address distribution devices distribute IP addresses having different values with respect to an IP address request from the same terminal, the total number of IP addresses allocatable to the terminals decreases in accordance with the number of IP-address distribution devices. In contrast, in the present embodiment, the total number of IP addresses allocatable to the terminals become constant, regardless of the number of IP-address distribution devices.

The respective IP-address distribution devices may synchronize the information, for example, by exchanging the information on the IP addresses not in use (or allocated IP addresses) at a predetermined timing. Accordingly, the process of distributing the same IP address to the same terminal can be performed more reliably.

In this manner, in the IP-address distribution system according to the present embodiment, because the respective IP-address distribution devices perform the distribution process of the IP address corresponding to the source specific information in the IP-address request signal, effects similar to those of the first and second embodiments can be achieved, and efficient operations of the IP address can be realized. Furthermore, the IP addresses can be managed and distributed for each model. For example, when the IP-address distribution system according to the present embodiment is applied to a train, the IP addresses in a different range determined beforehand can be distributed for each device group of the same type, such as a brake device, an air-conditioning device, and a guidance display device.

In the present embodiment, a case where the IP-address request signal including the source specific information is used in the IP-address distribution system explained in the second embodiment is shown. However, the IP-address request signal including the source specific information may be used in the IP-address distribution system explained in the first embodiment, so that the IP addresses can be managed and distributed for each model.

Fourth Embodiment.

Figure 6:
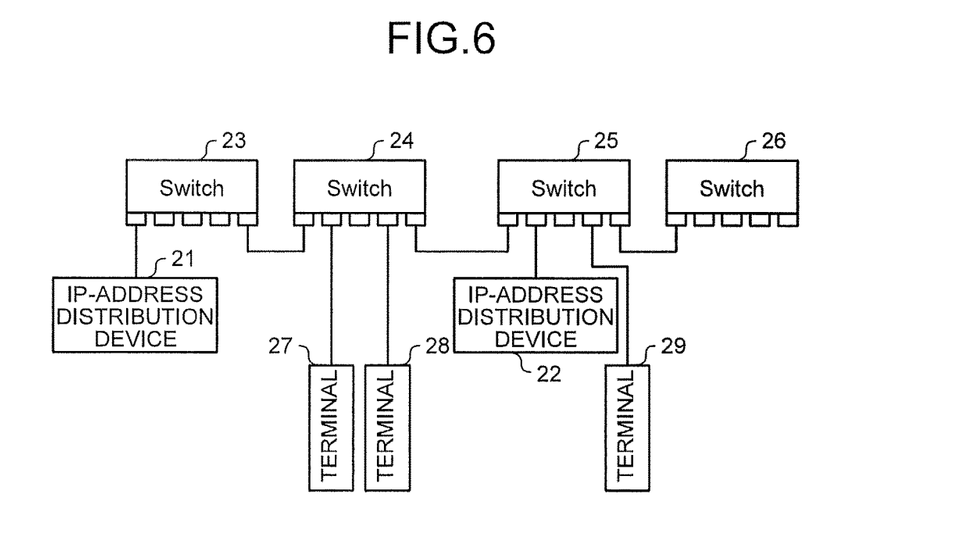
FIG. 6 is a diagram illustrating a configuration example of an IP-address distribution system according to a fourth embodiment.

FIG. 6 is a diagram illustrating a configuration example of an IP-address distribution system according to the fourth embodiment. The IP-address distribution system according to the present embodiment includes IP-address distribution devices 21 and 22 and switches 23 to 26. The IP-address distribution device 21 is connected to the switch 23, and the IP-address distribution device 22 is connected to the switch 25. The switch 23 is connected to the switch 24, and the switch 24 is connected to the switches 23 and 25. The switch 25 is connected to the switches 24 and 26, and the switch 26 is connected to the switch 25. Terminals 27 and 28 are connected to the switch 24, and a terminal 29 is connected to the switch 25. The terminals 27 to 29 perform operations similar to the terminals described in the first embodiment to receive allocation of the IP address.

At a physical port used for connection to the switch 25, of the physical ports of the switch 24, the signal of the logical port number 67 and the signal of the logical port number 68 are interrupted. At a physical port used for connection to the switch 24, of the physical ports of the switch 25, the signal of the logical port number 67 and the signal of the logical port number 68 are interrupted.

By applying the configuration described above, the IP-address request signal of the logical port number 68 transmitted by the terminal 27 reaches the IP-address distribution device 21. However, because the IP-address request signal cannot pass through the physical port used for connection to the switch 25, of the physical ports of the switch 24, the IP-address request signal does not reach the IP-address distribution device 22. As a result, the terminal 27 uses the IP address distributed from the IP-address distribution device 21.

Meanwhile, the IP-address request signal of the logical port number 68 transmitted by the terminal 29 reaches the IP-address distribution device 22. However, because the IP-address request signal cannot pass through the physical port used for connection to the switch 24, of the physical ports of the switch 25, the IP-address request signal does not reach the IP-address distribution device 21. As a result, the terminal 29 uses the IP address distributed from the IP-address distribution device 22.

In this manner, the method similar to that of the first embodiment can be applied to the system having the configuration shown in FIG. 6, and the network devices can be grouped, and the IP addresses can be managed and distributed for each group.

Fifth Embodiment.

Figure 7:
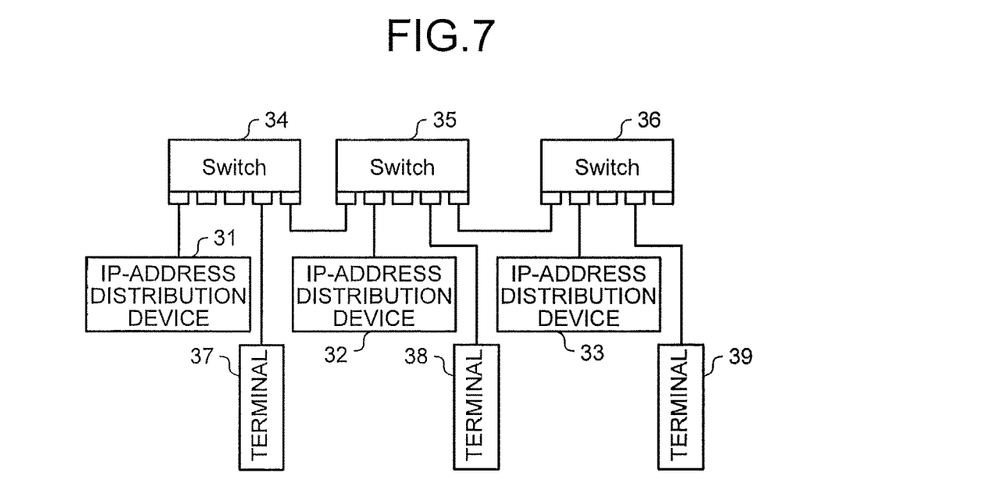
FIG. 7 is a diagram illustrating a configuration example of an IP-address distribution system according to a fifth embodiment.

FIG. 7 is a diagram illustrating a configuration example of an IP-address distribution system according to the fifth embodiment. The IP-address distribution system according to the present embodiment includes IP-address distribution devices 31 to 33 and switches 34 to 36. The IP-address distribution device 31 is connected to the switch 34, the IP-address distribution device 32 is connected to the switch 35, and the IP-address distribution device 33 is connected to the switch 36. The switch 34 is connected to the switch 35, and the switch 35 is connected to the switches 34 and 36. The switch 36 is connected to the switch 35. Terminals 37 to 39 are respectively connected to the switches 34 to 36. In the respective switches, a physical port used for connection to other switches interrupts the signal of the logical port number 67 and the signal of the logical port number 68. Accordingly, the terminals connected to the same switch can be handled as one group, and the IP addresses can be managed and distributed for each group.

In this manner, in the IP-address distribution system according to the present embodiment, the IP-address distribution devices are connected to the respective switches, and the physical port used for connection to other switches interrupts the signal of the logical port number 67 and the signal of the logical port number 68 in the respective switches. Accordingly, effects similar to those of the first embodiment can be achieved, and the IP-address distribution device can be incorporated in the switch and integrated with the switch.

Sixth Embodiment.

Figure 8:
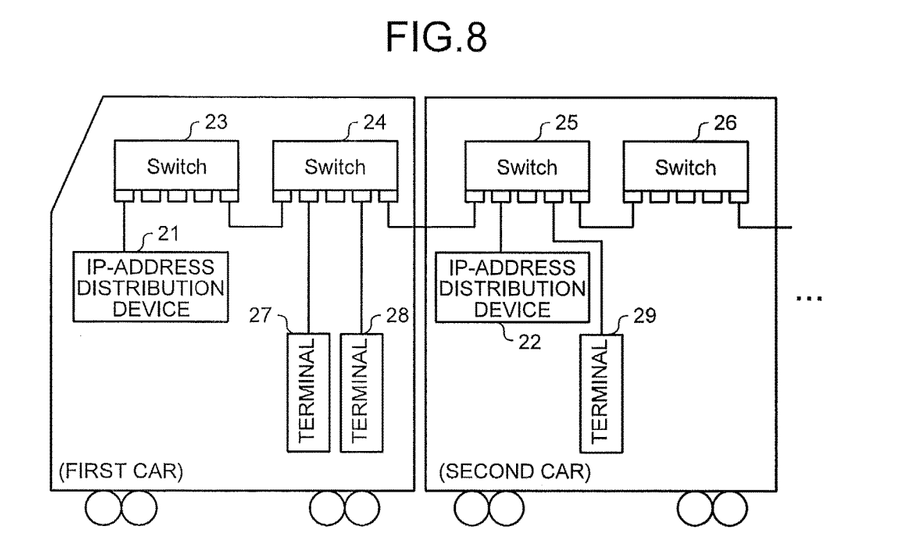
FIG. 8 is a diagram illustrating a configuration example of an IP-address distribution system according to a sixth embodiment.

FIG. 8 is a diagram illustrating a configuration example of an IP-address distribution system according to the sixth embodiment. In the IP-address distribution system, the IP-address distribution system having the configuration described in the fourth embodiment (see FIG. 6) is installed in a train including a plurality of vehicles. In FIG. 8, constituent elements identical to those of the IP-address distribution system according to the fourth embodiment are denoted by like reference signs. The IP-address distribution device 21, the switches 23 and 24, and the terminals 27 and 28 are arranged in a first car, and the IP-address distribution device 22, the switches 25 and 26, and the terminal 29 are arranged in a second car.

The IP-address distribution device 21 installed in the first car manages and distributes IP addresses of terminals used in the first car. The IP-address distribution device 22 installed in the second car manages and distributes the IP addresses of terminals used in the second car.

Therefore, the respective physical ports that connect the switch installed in the first car and the switch installed in the second car interrupt a signal of a logical port number used for distribution of the IP address. Specifically, at the physical port used for connection to the switch 25, of the physical ports of the switch 24, the signal of the logical port number 67 and the signal of the logical port number 68 are interrupted. At the physical port used for connection to the switch 24, of the physical ports of the switch 25, the signal of the logical port number 67 and the signal of the logical port number 68 are interrupted.

In the present embodiment, an explanation is made of a case where the terminals 27 and 29 are brake devices in the train (hereinafter, the terminal 27 is described as a brake device 27, and the terminal 29 is described as a brake device 29). When the IP address is acquired, the brake device 27 transmits an IP-address request signal. At this time, the brake device 27 transmits the IP-address request signal by broadcast with the logical port number 68. Because the IP-address distribution device 21 is installed in the first car, upon reception of the IP-address request signal of the brake device 27, the IP-address distribution device 21 distributes an IP address for the brake device in the first car. As a result, the brake device 27 can use the IP address for the brake device in the first car.

The brake device 27 transmits the IP-address request signal in which information indicating that the terminal itself is a brake device is set. The information indicating that the terminal itself is a brake device is set, for example, in the source specific information shown in FIG. 5. The IP address for the brake device is determined beforehand, and upon reception of the IP-address request signal transmitted from the brake device 27, the IP-address distribution device 21 notifies the brake device 27 of the IP address for the brake device by the IP-address distribution signal.

When the IP address is acquired, the brake device 29 transmits an IP-address request signal in a similar manner. At this time, the brake device 29 transmits the IP-address request signal by broadcast with the logical port number 68. Because the IP-address distribution device 22 is installed in the second car, upon reception of the IP-address request signal of the brake device 29, the IP-address distribution device 22 distributes an IP address for the brake device in the second car. As a result, the brake device 29 can use the IP address for the brake device in the second car.

In this manner, in the present embodiment, the IP-address distribution device is installed in each vehicle of the train, and a switch connected to a switch installed in other vehicles interrupts the signal of the logical port number 67 and the signal of the logical port number 68 at the physical ports to which the switch installed in other vehicles is connected. Accordingly, the IP address can be distributed to the terminals installed in the respective cars by a system depending on the car number (the vehicle). Because the information indicating the device type (such as information indicating the brake device) is set in the IP-address request signal, allocation of the IP address according to the type of the device that requests the IP address can be realized.

In the present embodiment, an explanation is made of the example in which the physical port used for connection between switches with different car numbers is set such that signals of the logical port numbers 67 and 68 are interrupted. However, when the function is divided in the car, interruption of a logical port number can be set in the car. It is obvious that interruption of a logical port number may be set only in the car (it is not essential to interrupt a signal at a connection port with a switch set in a different vehicle). Furthermore, in the case where a train includes three or more vehicles, signals of the logical port numbers 67 and 68 are set to be interrupted only at a part of the physical ports, of the respective physical ports used for connection between the switches with different car numbers, and the IP addresses can be managed and distributed by grouping the terminals installed in a plurality of vehicles as the same group.

Seventh Embodiment.

Figure 9:
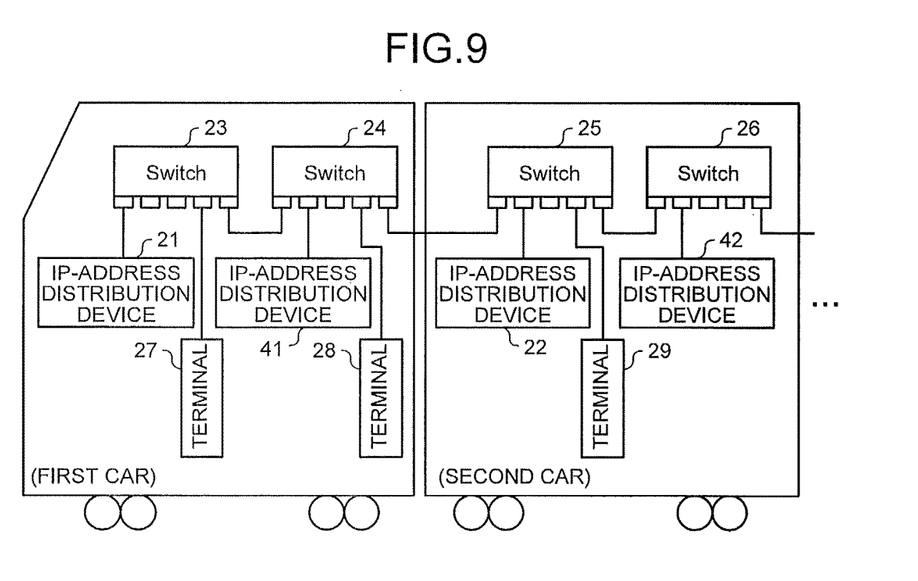
FIG. 9 is a diagram illustrating a configuration example of an IP-address distribution system according to a seventh embodiment.

FIG. 9 is a diagram illustrating a state where the IP-address distribution system is installed in a train including a plurality of vehicles. In FIG. 9, constituent elements identical to those of the IP-address distribution system explained in the sixth embodiment (see FIG. 8) are denoted by like reference signs. In the present embodiment, explanations of portions common to the IP-address distribution system according to the sixth embodiment will be omitted.

As shown in FIG. 9, the IP-address distribution system according to the present embodiment has such a configuration that IP-address distribution devices 41 and 42 are added to the IP-address distribution system explained in the sixth embodiment. The IP-address distribution device 41 is installed in the first car and is connected to the switch 24. The IP-address distribution device 42 is connected to the switch 26 in the second car. The connection destination of the terminal 27 (the brake device) is different from that of the sixth embodiment.

The IP-address distribution devices 21 and 41 installed in the first car manage and distribute the IP address of the terminal used in the first car. The IP-address distribution devices 22 and 42 installed in the second car manage and distribute the IP address of the terminal used in the second car.

Therefore, in the switches 24 and 25 connected to a switch installed in the other vehicles, among the signals transmitted from the terminal or the IP-address distribution device in the vehicle in which the switch 24 or 25 is installed, the signal of the logical port number 67 and the signal of the logical port number 68 are interrupted at the physical port to which the switch installed in the other vehicles is connected so that these signals do not reach the respective devices (the IP-address distribution devices and the terminals) installed in the other vehicles.

One of the IP-address distribution devices 21 and 41 operates as the first IP-address distribution device explained in the second embodiment, and the other operates as the second IP-address distribution device explained in the second embodiment. Moreover, one of the IP-address distribution devices 22 and 42 operates as the first IP-address distribution device explained in the second embodiment, and the other operates as the second IP-address distribution device explained in the second embodiment.

Because the configuration described above is adopted in the IP-address distribution system according to the present embodiment, similarly to the sixth embodiment, the IP address can be distributed to the terminals installed in the respective cars by the system depending on the car number. Even when one of the IP-address distribution devices is broken down or there is a transmission failure to one of the IP-address distribution devices, the IP address can be distributed, thereby enabling to improve fault tolerance.

It has been explained that the respective IP-address distribution devices operate as the first or second IP-address distribution device explained in the second embodiment. However, the IP-address distribution devices may operate as the first or second IP-address distribution device explained in the third embodiment.

All of the IP-address distribution systems according to the first to fifth embodiments can be installed in a train including a plurality of vehicles.

INDUSTRIAL APPLICABILITY

As described above, the IP-address distribution system according to the present invention is useful in the case where management and allocation of an IP address need to be performed while taking the physical configuration of the network into consideration.

REFERENCE SIGNS LIST 1, 2, 15, 16, 21, 22, 31, 32, 33, 41, 42 IP-address distribution device
3 to 8, 23 to 26, 34 to 36 Ethernet switch (Switch)
9 to 12, 27 to 29, 37 to 39 terminal
13, 14 physical port

The invention claimed is:

1. An IP-address distribution system comprising:
a network formed by a plurality of switching devices; and
a plurality of IP-address distribution devices connected to the network, wherein the switching devices are grouped into two or more groups, wherein at least one of the IP-address distribution devices is connected to a sub-network, which is a network formed by switching devices in a same group, and
a switching device, among the switching devices, having a physical port connected to another switching device in another group is configured to interrupt, at the physical port, an IP-address request signal, transmitted to the plurality of IP-address distribution devices from a terminal included in a first group that requests allocation of an IP address from the plurality of IP-address distribution devices, wherein the interruption includes blocking passage of the IP-address request signal between a logical port of a first switching device in the first group and a logical port of a second switching device in a second group and preventing the IP-address request signal from reaching at least one of the plurality of IP-address distribution devices which is connected to a sub-network of the second group that is different from the first group.

2. The IP-address distribution system according to claim 1, wherein the switching device further interrupts, at the physical port, an IP-address distribution signal transmitted from the at least one IP-address distribution device connected to the sub-network to the terminal in response to the IP-address request signal.

3. The IP-address distribution system according to claim 1, wherein one IP-address distribution device is connected to each sub-network.

4. The IP-address distribution system according to claim 1, wherein when two or more IP-address distribution devices are connected to a same sub-network, upon reception of an IP-address request signal transmitted from a same source terminal, the two or more IP-address distribution devices connected to the same sub-network distribute IP addresses different from each other.

5. The IP-address distribution system according to claim 1, wherein when two or more IP-address distribution devices are connected to a same sub-network, each of the two or more IP-address distribution devices connected to the same sub-network manages a same IP address, shares information on allocation status of each IP address with another IP-address distribution device, and upon reception of an IP-address request signal transmitted from a same source terminal, distributes the same IP address.

6. The IP-address distribution system according to claim 1, wherein
the IP-address request signal includes device type information on a source terminal, and
the IP-address distribution devices distribute an IP address in a different range for each device type.

7. The IP-address distribution system according to claim 1, wherein the network is a network constructed in a train.

8. The IP-address distribution system according to claim 7, wherein switching devices installed in a same vehicle are grouped into a same group.

9. The IP-address distribution system according to claim 1, wherein the switching devices are Ethernet switches.

10. The IP-address distribution system according to claim 1, wherein:
   the IP-address request signal is associated with a first logical port identifier, and
   the interruption includes blocking signals associated with the first logical port identifier.

11. The IP-address distribution system according to claim 10, wherein:
   one or more of the plurality of IP-address distribution devices is configured to transmit an IP-address distribution signal assigning an IP address to the terminal, the IP address distribution signal being associated with a second logical port identifier, and
   the interruption includes blocking signals associated with the first logical port identifier and signals associated with the second logical port identifier.

12. The IP-address distribution system according to claim 1, wherein:
   one or more of the plurality of IP-address distribution devices is configured to transmit an IP-address distribution signal assigning an IP address to the terminal, the IP address distribution signal being associated with a first logical port identifier, and
   the interruption includes blocking signals associated with the first logical port identifier.

* * * * *